DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 10, 1970

871 O.G. 353

T871,002

LOWER ALKYL (ω-ALKYNYL)(ARYL) PHOSPHINATE SYNERGISTS FOR CYCLOPROPANECARBOXYLATE INSECTICIDES

Ronald Eugene Montgomery, 46 S. Vernon St., Middleport, N.Y. 14105, and Harry Hobart Incho, 137 Ensign Ave., Medina, N.Y. 14103

Filed Apr. 24, 1969, Ser. No. 819,121

Int. Cl. A01n *9/02, 9/28, 9/36*

U.S. Cl. 424—219

No Drawing. 11 Pages Specification

Synergistic insecticidal combinations of lower alkyl (ω-alkynyl)(aryl)phosphinates with esters of cyclopropanecarboxylic acid such as pyrethrins, allethrin, (1-cyclohexene-1,2-dicarboximido)methyl chrysanthemumate, (5-benzyl-3-furyl)methyl 2,2,3,3-tetramethylcyclopropanecarboxylate, and (5-benzyl-3-furyl)methyl chrysanthemumate, are described. The preparation and properties of the phosphinates are exemplified, and their insecticidal properties in synergistic combinations with representative cyclopropanecarboxylates are reported.